US009615019B2

(12) United States Patent
Funamoto

(10) Patent No.: US 9,615,019 B2
(45) Date of Patent: Apr. 4, 2017

(54) IMAGE CAPTURING APPARATUS AND CONTROL METHOD FOR IMAGE CAPTURING APPARATUS WITH PARTICLE FILTER FOR MAIN OBJECT DETECTION AND SELECTING FOCUS DETECTION AREA BASED ON PRIORITY

(71) Applicant: CANON KABUSHIKI KAISHA, Tokyo (JP)

(72) Inventor: Shohei Funamoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/843,868

(22) Filed: Sep. 2, 2015

(65) Prior Publication Data
US 2016/0073006 A1 Mar. 10, 2016

(30) Foreign Application Priority Data

Sep. 8, 2014 (JP) ................. 2014-182679

(51) Int. Cl.
H04N 5/232 (2006.01)
G06K 9/00 (2006.01)
G03B 13/36 (2006.01)
G06T 7/20 (2017.01)
G02B 7/28 (2006.01)
G02B 7/36 (2006.01)

(52) U.S. Cl.
CPC ......... H04N 5/23212 (2013.01); G02B 7/285 (2013.01); G02B 7/365 (2013.01); G03B 13/36 (2013.01); G06K 9/00771 (2013.01); G06T 7/20 (2013.01); G06T 2207/10016 (2013.01)

(58) Field of Classification Search
CPC .... H04N 5/23212; G02B 7/285; G02B 7/365; G02B 13/36; G06K 9/00771; G06T 7/20; G06T 2207/10016
See application file for complete search history.

(56) References Cited

U.S. PATENT DOCUMENTS 8,436,933 B2 * 5/2013 Hirai ................. G02B 7/36
348/208.12
9,386,213 B2 * 7/2016 Matsumoto ........ H04N 5/23212
(Continued)

FOREIGN PATENT DOCUMENTS

JP 2009-188977 A 8/2009
JP 2012-226206 A 11/2012

OTHER PUBLICATIONS

Isard, M., et al., "Condenstation- Conditional Density Propagation for Visual Tracking", International Journal of Computer Vision, 1998, pp. 5-28, vol. 29, No. 1.
(Continued)

Primary Examiner — Nicholas Giles
(74) Attorney, Agent, or Firm — Canon USA Inc., IP Division

(57) ABSTRACT

Focus detection can be performed preferentially in an area that is likely to include a main object. An image capturing apparatus is configured to detect a main object in an image with a particle filter, divide the image into divided areas respectively corresponding to a plurality of focus detection areas, set a priority to each of the focus detection areas based on a distributed state of particles distributed in each of the divided areas, and select the focus detection area based on the set priority.

22 Claims, 14 Drawing Sheets

(56) References Cited

U.S. PATENT DOCUMENTS

2011/0032411 A1* 2/2011 Hirai .................. G02B 7/36
                                                348/345
2014/0192216 A1* 7/2014 Matsumoto ........ H04N 5/23212
                                                348/222.1
2014/0232928 A1* 8/2014 Ono ................... G02B 27/0075
                                                348/349

OTHER PUBLICATIONS

Tomoyuki Higuchi, "Particle Filter", the Journal of the Institute of Electronics, Information and Communication Engineers, vol. 88, No. 12, pp. 989 to 994, Dec. 1, 2005.

* cited by examiner

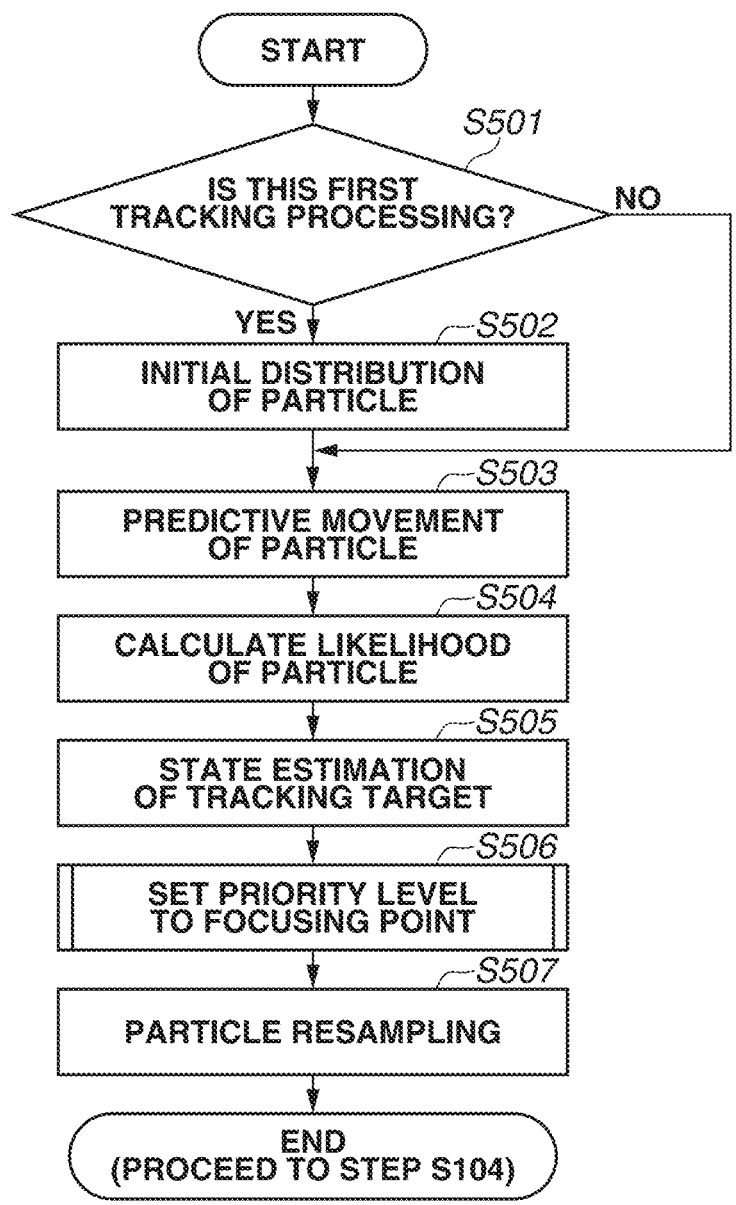

IMAGE CAPTURING APPARATUS AND CONTROL METHOD FOR IMAGE CAPTURING APPARATUS WITH PARTICLE FILTER FOR MAIN OBJECT DETECTION AND SELECTING FOCUS DETECTION AREA BASED ON PRIORITY

BACKGROUND OF THE INVENTION

Field of the Invention

The present invention relates to an image capturing apparatus and a control method for the image capturing apparatus and particularly to a technique suitably used in an object detection device mounted in the image capturing apparatus.

Description of the Related Art

A conventionally known object tracking device in an image capturing apparatus including an image sensor, detects a main object from a certain frame of continuously captured images and tracks the main object in subsequent frames. By detecting a position of the main object in the image, the image capturing apparatus having such an object tracking device can automatically control the orientation of the image capturing apparatus in accordance with the movement of the main object, and can appropriately execute auto focus (AF) adjustment and automatic exposure (AE) calculation for the main object.

However, object tracking is a difficult task, which might lose a tracking target or track an object different from the intended tracking target due to a change in the color and the shape of an object or an influence of noise, for example. Even when the object tracking device can accurately track the tracking target, if a contrast of the tracking target is low, the image capturing apparatus fails to detect a focal point, and the auto focus adjustment ends in failure.

As one approach proposed to solve the failure of AF tracking, an estimation method utilizing probability has been used to estimate a state of a tracking target. The estimation methods include what is known as a "particle filter" in which Bayesian estimation is sequentially performed on time series data.

The particle filter is a method for estimating current time series data from data obtained by performing prediction based on past time series data and observing the current time series data based on a finite number of sample points referred to as particles. A probability distribution on time series data is approximated using a group of the particles each showing a likelihood function based on the predicted data and the observed data. Thus, the particle filter can be applied to both non-linear and non-Gaussian probability distributions.

The estimation method using the particle filter sets a likelihood function in accordance with a time series data model to perform target tracking. For example, image tracking methods using the particle filter are discussed in "CONDENSATION—Conditional Density Propagation for Visual Tracking," by M. Isard and A. Blake, International Journal of Computer Vision, Vol. 29, No. 1, pp. 5 to 28, 1998; and "Particle Filter", by Tomoyuki Higuchi, the Journal of the Institute of Electronics, Information and Communication Engineers, Vol. 88, No. 12, pp. 989 to 994, 1 Dec. 2005.

In a known method for solving the failure of AF tracking, a detected position of the main object on the image coordinates is represented not by a single point but by a plurality of coordinates or an area. This method can achieve higher chance of detecting an area suitable for focus detection.

For example, Japanese Patent Application Laid-Open No. 2009-188977 discusses an object tracking technique based on the particle filter. A target tracking apparatus discussed in Japanese Patent Application Laid-Open No. 2009-188977 measures a likelihood obtained through comparison of the color in a tracking target with the color in the proximity of a particle moving in an image under a predetermined rule, to estimate an area including the tracking target.

Further, Japanese Patent Application Laid-Open No. 2012-226206 discusses a technique for detecting a focal point in an area within a main object area, which is suitable for the focus detection by detecting a plurality of main object candidate positions. An image tracking device and an image capturing apparatus discussed in Japanese Patent Application Laid-Open No. 2012-226206 estimate a plurality of main object positions through the tracking processing and the plurality of the main object positions are used as a main object candidate area. Then, the focus detection is performed on each of the main object candidate areas.

If one of the plurality of candidate areas most similar to the main object is suitable for the focus detection, focus adjustment is performed based on a result of the focus detection carried out in the area.

On the other hand, when the candidate area having the highest similarity is unsuitable for the focus detection, an area suitable for the focus detection is selected from the other candidate areas and the focus adjustment is performed with the area.

However, the conventional technique discussed in Japanese Patent Application Laid-Open No. 2009-188977 does not refer to the focus adjustment for the main object and thus cannot be directly applied to an image capturing apparatus that performs the focus adjustment.

When the focus detection cannot be performed in the area most similar to the main object, the conventional technique discussed in Japanese Patent Application Laid-Open No. 2012-226206 described above selects the area on which focus detection is performed, without taking similarities of other candidate areas into consideration. Consequently, even when there is another candidate area having high similarity, the similarity is not taken into consideration in selecting the area on which focus detection is performed.

SUMMARY OF THE INVENTION

The present invention is directed to a technique with which focus detection can be preferentially performed on an area that is likely to include a main object.

An image capturing apparatus according to the present invention includes an image capturing unit configured to capture an image formed by an imaging optical system, an object detection unit having a particle filter and configured to detect a main object in the image with the particle filter, a focus detection unit configured to detect a focus state of an object with a plurality of focus detection areas, a selection unit configured to select an area where a focal point is detected, from the plurality of the focus detection areas, and a focus calculation unit configured to calculate a focal position of the imaging optical system based on a signal output from the focus detection area selected by the selection unit. The selection unit is configured to divide the image into divided areas respectively corresponding to the plurality of focus detection areas, set a priority to each of the focus detection areas based on a distributed state of particles distributed in a corresponding one of the divided areas, detected by the object detection unit, and select the focus detection area based on the priority.

Further features of the present invention will become apparent from the following description of exemplary embodiments with reference to the attached drawings.

BRIEF DESCRIPTION OF THE DRAWINGS

FIG. 5 is a flowchart illustrating operation processing executed by an object tracking unit in the image capturing apparatus according to the first exemplary embodiment.

DESCRIPTION OF THE EMBODIMENTS

Exemplary embodiments of the present invention are described in detail below with reference to the attached drawings.

A first exemplary embodiment of the present invention is described below. An image capturing apparatus according to the first exemplary embodiment of the present invention is described with reference to FIG. 2. The image capturing apparatus according to the present exemplary embodiment forms an image from an object image formed by an imaging optical system.

Figure 2:
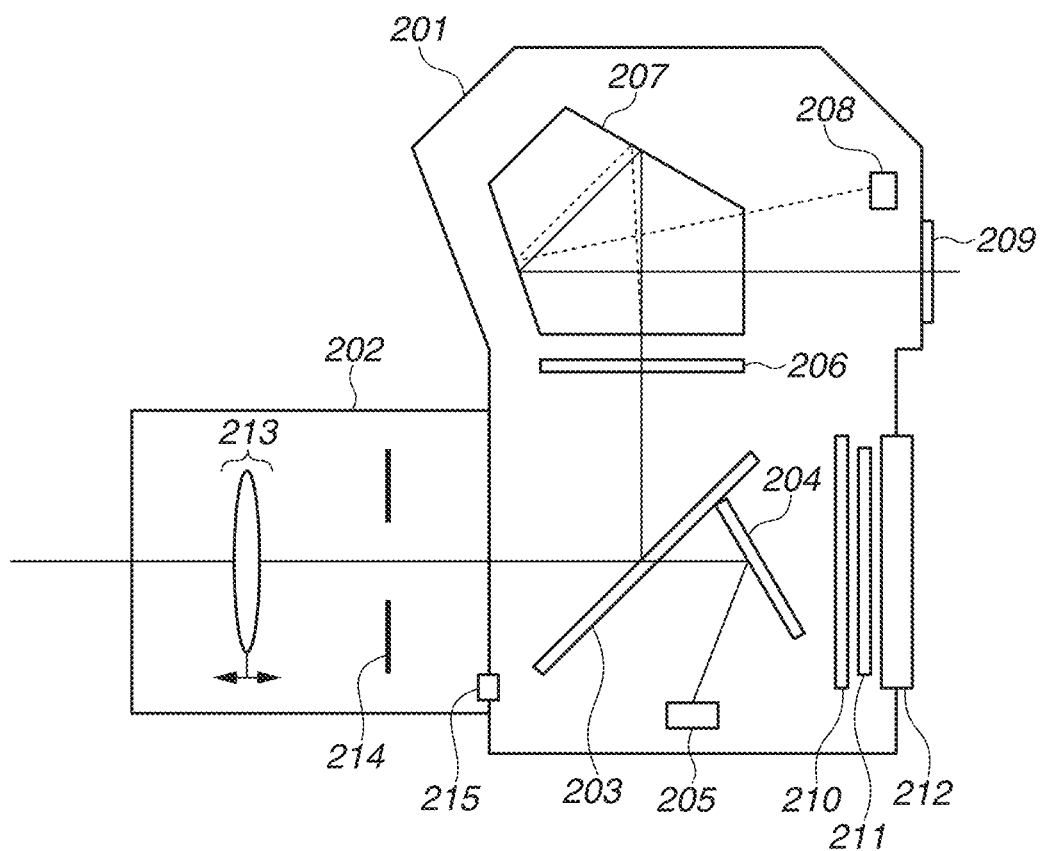
FIG. 2 is a schematic view illustrating a schematic configuration of the image capturing apparatus according to the first exemplary embodiment.

In FIG. 2, an imaging lens 202 is mounted on the front surface of a digital single-lens reflex camera main body 201. The imaging lens 202 is exchangeable and is electrically connected to the camera main body 201 via a mount contact group 215. The imaging lens 202 incorporates a focusing lens 213 and a diaphragm shutter 214. An adjustment of an amount of light to be taken into the camera, and focus adjustment can be realized through control via the mount contact group 215.

A main mirror 203 and a sub mirror 204 are quick return mirrors. The main mirror 203 is a semitransparent mirror. The main mirror 203 is obliquely disposed on a photographic optical path in a finder viewing state and reflects a light flux entering from the imaging lens 202 to a finder optical system. Light transmitted through the main mirror 203 enters a ranging sensor 205 through the sub mirror 204.

The ranging sensor 205 forms a secondary imaging plane of the imaging lens 202 on a focus detection line sensor, and thus generates an image signal. For the image signal, a focus adjustment state of the imaging lens 202 can be detected using a phase difference detection method.

A focusing screen 206 is disposed on a prospective imaging plane of the imaging lens 202 functioning as a part of the finder optical system.

A photographer who views the focusing screen 206 through a pentagonal prism 207 from an eye piece 209, can check an imaging screen and a focusing point mark.

A light metering sensor 208 generates image data including a luminance signal and a chrominance signal from an incident light signal. The image data generated by the light metering sensor 208 is used for detection of object luminance and automatic exposure calculation, and is further used for object tracking processing.

When exposure is performed, the main mirror 203 and the sub mirror 204 are retracted from the photographic optical path and a focal plane shutter 210 is opened, whereby an image sensor 211 is exposed to light. A display unit 212 displays imaging information and a captured image.

Figure 3:
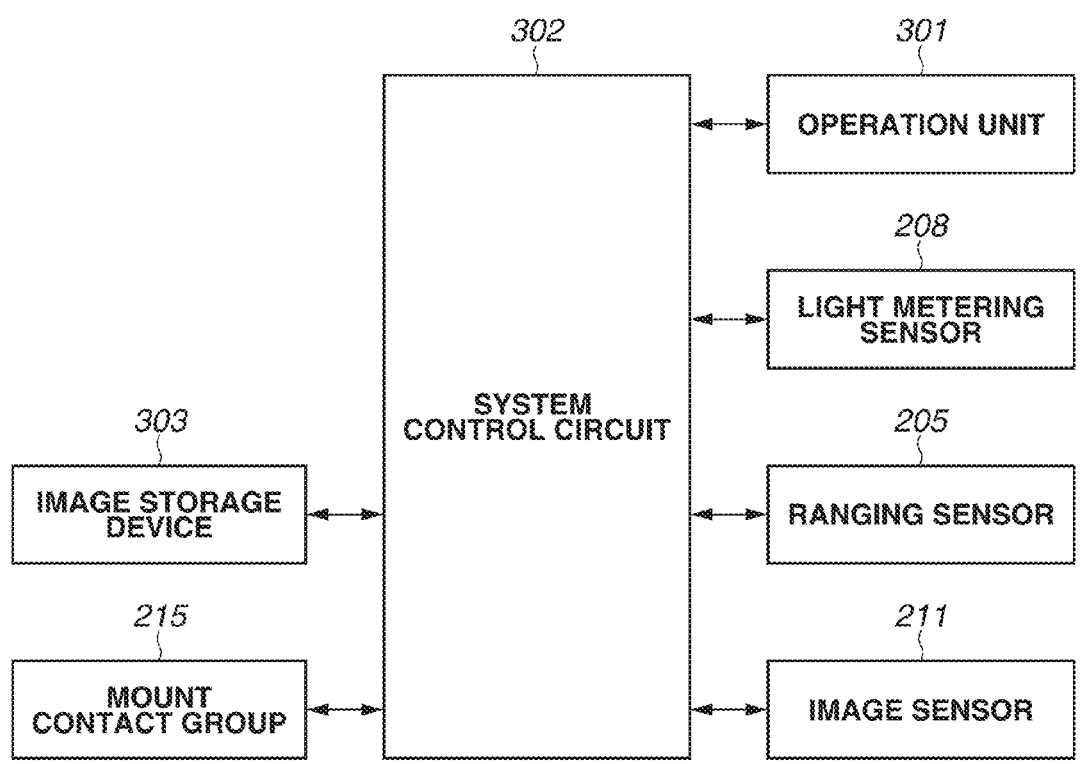
FIG. 3 is a block diagram illustrating a basic configuration of the image capturing apparatus according to the first exemplary embodiment.

Functional blocks of the image capturing apparatus according to the present exemplary embodiment are described with reference to the schematic view in FIG. 2 and diagrams in FIG. 3 and FIG. 4. The components in FIG. 3 that are the same as the counterparts in FIG. 2 are denoted with the reference numerals of the counterparts in FIG. 2.

An operation unit 301 detects a user operation performed via a release button, a switch, a dial, connected equipment (not illustrated), and the like, which are attached to the camera main body 201, and transmits a signal corresponding to the operation to a system control circuit 302.

The release button is a two-stage pressing switch (SW) having half-pressed (SW1) and full-pressed (SW2) states. The operation unit 301 outputs to the system control circuit 302, an SW1 signal at the moment that the release button is half pressed and an SW2 signal at the moment that the release button is fully pressed. The operation unit 301 outputs an SW release signal to the system control circuit 302 at the moment that the user releases the release button.

The system control circuit 302 performs a preparation operation for the image capturing such as automatic exposure calculation or automatic focusing when the SW1 signal is received. The system control circuit 302 executes image capturing processing when the image sensor 211 is exposed to light in a case where the SW2 signal is received. Hereinafter, the half-pressed state and the full-pressed state of the release button are respectively referred to as SW1 and SW2 states.

The light metering sensor 208 generates, from the incident light signal, image data used for automatic exposure calculation and object tracking and outputs the image data to the system control circuit 302. The system control circuit 302 executes automatic exposure calculation based on the image data received from the light metering sensor 208. The system control circuit 302 then adjusts the amount of light that enters the camera main body 201 by controlling the diaphragm of the diaphragm shutter 214 based on the calculation result. Furthermore, the system control circuit 302 adjusts an exposure time period of the image sensor 211 by controlling the focal plane shutter 210 at the time of the release based on the result of the automatic exposure calculation.

In the SW1 and the SW2 states, the system control circuit 302 executes the object tracking processing on the image data received from the light metering sensor 208 and detects the position of a main object in the image. According to the present invention, the object tracking processing employs image tracking algorithms discussed in M. Isard and A. Blake, "CONDENSATION—Conditional Density Propagation for Visual Tracking" and Tomoyuki Higuchi, "Particle filter" described above.

Figures 4A, 4B:
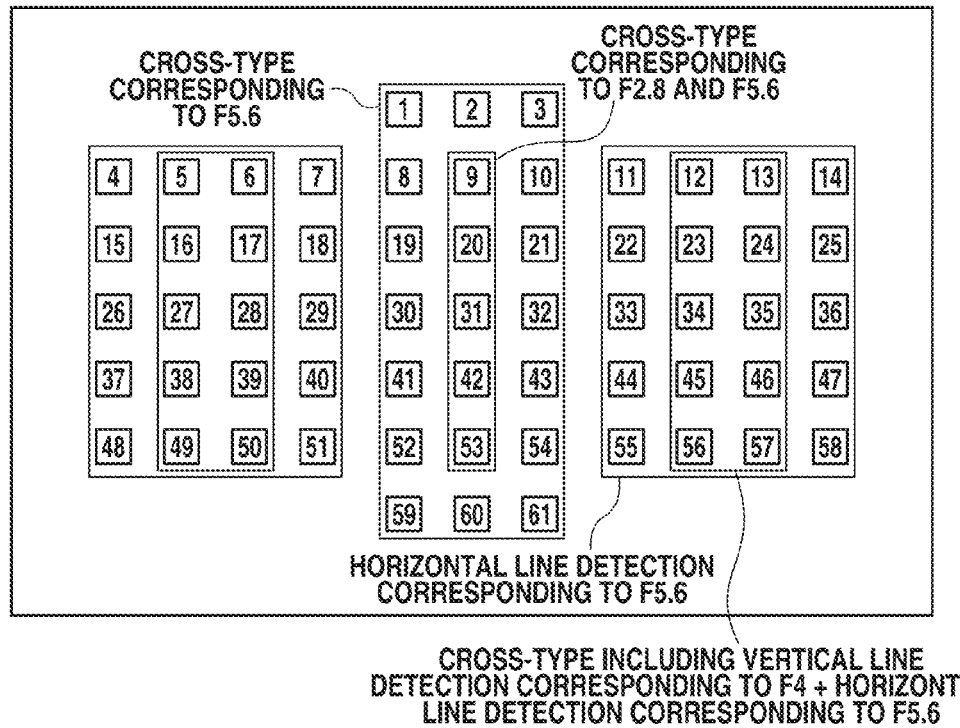
FIG. 4A is a diagram illustrating an arrangement of focusing points of the image capturing apparatus according to the first exemplary embodiment.
FIG. 4B is a diagram illustrating a light metering sensor image.

The ranging sensor 205 includes a plurality of line sensors corresponding to a focusing point arrangement illustrated in FIG. 4A. The ranging sensor 205 generates an image signal from an image entering via the sub mirror 204 and outputs the image signal to the system control circuit 302. The system control circuit 302 calculates a defocus amount of each focusing point from the image signal received from the ranging sensor 205 by the phase difference detection method which is a known technique, and performs focus detection. The system control circuit 302 performs focus adjustment by controlling the focusing lens 213 through the mount contact group 215 based on a result of the focus detection in a focusing point.

The line sensors include two types of optical sensors which are horizontal and vertical line detection sensors that respectively detect phase differences in the horizontal and the vertical lines. Each focusing point corresponds to either a horizontal line detection sensor, a vertical line detection sensor, and a focusing point at a location where the horizontal and vertical line detection sensors cross each other corresponds to a cross-type sensor. The highest focus detection performance can be achieved at a focusing point corresponding to a cross-type sensor. That is, a focusing point corresponding to a cross-type sensor has the highest reliability.

An F number indicating the size of the light flux with which the focal point can be detected, is set for each line sensor. The respective line sensors corresponding to F2.8, F4.0, and F5.6 are arranged at respective positions. A smaller F number has an advantage in that the focal point can be detected in a darker illumination environment and that a higher accuracy can be achieved because a base length can be longer under the triangulation principle.

On the other hand, a larger F number has an advantage in that a lens with a smaller effective aperture can be used and a range of distance to detect the focal point can be wider.

The focusing point used for the focus adjustment based on the focus detection result may be manually and directly selected by the user or may be automatically selected by the image capturing apparatus. When the image capturing apparatus automatically selects the focusing point, the focusing point is selected in such a manner that the object closest to the image capturing apparatus is focused as a result of the focus detection. Alternatively, when the object tracking processing effectively operates and the main object is detected, the focusing point is selected that corresponds to an area where the main object is detected in the image output from the light metering sensor 208.

How the areas in the image output from the light metering sensor 208 correspond to the focusing points is set as illustrated in FIG. 4B. The light metering sensor 208 outputs a light metering sensor image 401 in which a focusing point corresponding area group 402 is set. The focusing point corresponding area group 402 is divided into divided areas corresponding one-to-one to focusing points in FIG. 4A. Each focusing point corresponds to a focusing point corresponding area where the number in FIG. 4B matches the number of the focusing point in FIG. 4A.

The focusing points and the focusing point corresponding area corresponding to each other are irradiated with the same light flux in the ranging sensor 205 and the light metering sensor 208, respectively, and thus an image signal corresponding to the same object can be generated. Gray areas in the focusing point corresponding area group 402 that are denoted with the numbers 62 to 97 have no corresponding focusing point.

The system control circuit 302 controls the mirrors 203 and 204 and the focal plane shutter 210 based on the signal received from the operation unit 301. When the SW2 signal is output from the operation unit 301, the mirrors 203 and 204 are retracted from the photographic optical path, and the focal plane shutter 210 is controlled such that an image is formed on the image sensor 211. When the shutter control is completed, the mirrors 203 and 204 are again placed on the photographic optical path.

The image sensor 211 generates the image data from the image entering through the imaging lens 202 and outputs the image data to the system control circuit 302. The system control circuit 302 displays the image data received from the image sensor 211 on the display unit 212, and stores the image data in an image storage device 303.

Figure 1:
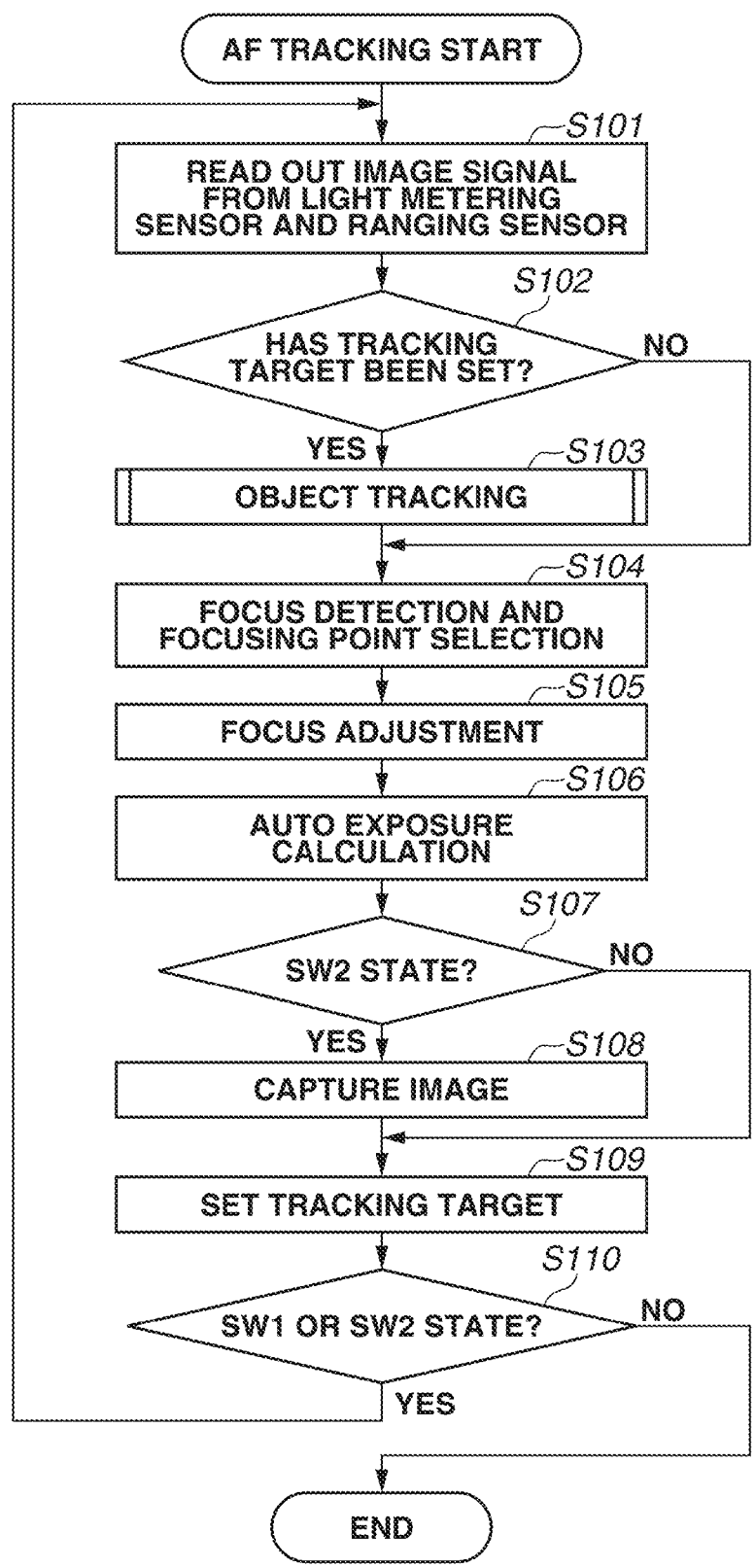
FIG. 1 is a flowchart illustrating operation processing executed by an image capturing apparatus according to a first exemplary embodiment.
Figure 10:
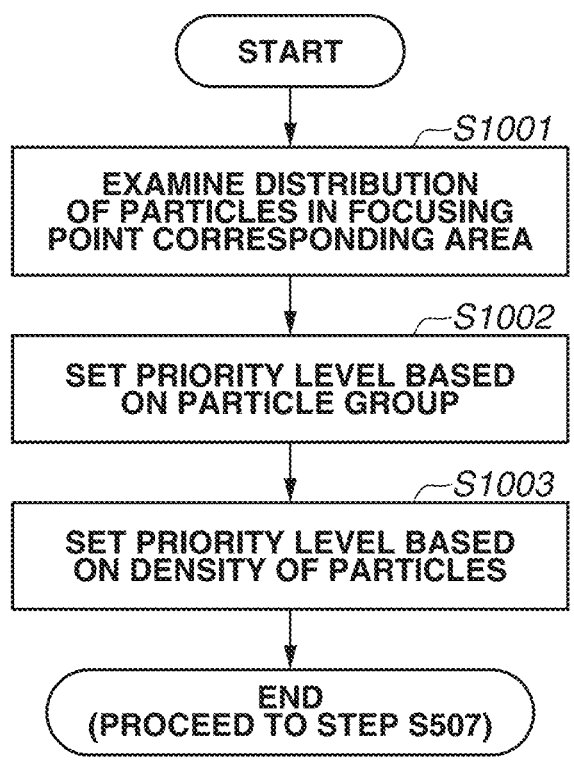
FIG. 10 is a flowchart illustrating processing of setting a priority to the focusing point in the image capturing apparatus according to the first exemplary embodiment.

Operation processing executed in the image capturing apparatus having an object tracking function according to the present exemplary embodiment is described with reference to a flowchart in FIG. 1. In FIGS. 1, 5, and 10, a processing step is described as "S", and thus, for example, "S101" represents step 101.

FIG. 1 is a flowchart illustrating AF tracking operation processing executed by one or more processors in the image capturing apparatus in the SW1 or the SW2 state according to an exemplary embodiment of the present invention. The processing starts at the moment that the SW1 or the SW2 signal is input to the system control circuit 302.

In step S101, the system control circuit 302 reads out an image signal from the light metering sensor 208 and the ranging sensor 205 and stores the image signal in a memory area in the system control circuit 302. The image read out from the light metering sensor 208 is hereinafter referred to as a light metering image.

In step S102, the system control circuit 302 determines whether a tracking target has been set. When the tracking target has been set (Yes in step S102), the processing proceeds to step S103. On the other hand, when the tracking target has not been set (No in step S102), the processing proceeds to step S104.

In step S103, the system control circuit 302 executes the object tracking processing on the light metering image using the particle filter. The system control circuit 302 then performs object detection that detects an area including the main object in the light metering image. The system control circuit 302 further sets to each focusing point a priority level representing a priority order in which the focus detection is executed, based on a result of the main object detection. How the main object is detected and how the priority level is set to the focusing point in the object tracking processing are described in detail below.

In step S104, the system control circuit 302 detects the focus state of each focusing point in each focus detection area and selects the focusing point used for the focus adjustment based on the focus state.

More specifically, the focusing point with the highest priority level set in step S103 is extracted as a selected focusing point candidate from all the focusing points. Then, the focus detection is performed on the extracted focusing point based on the image signal read out from the ranging sensor 205 in step S101. Here, if there is a plurality of the focusing points having the same priority level, these focusing points are all extracted as the selected focusing point candidates.

Then, condition determination is performed on the focus detection results of all the selected focusing point candidates. More specifically, it is determined whether the focus detection result is correctly obtained and whether the defocus amount is equal to or smaller than a predetermined value. Thus, a focusing point on which the focus detection cannot be performed due to a low contrast, or a focusing point having an unnatural defocus amount that cannot be caused by the movement of the object, is excluded from focus adjustment targets.

When there is a plurality of selected focusing point candidates satisfying the conditions, a focusing point in the proximity of focusing points having higher priority level is selected as the focusing point to be used for the focus adjustment. Alternatively, the focusing point having the smallest defocus amount may be selected as the focusing point to be used for the focus adjustment from the selected focusing point candidates satisfying the conditions.

When there is no focusing point satisfying the conditions, the focusing point having the next highest priority level is extracted as the selected focusing point candidate, and the focus detection and the condition determination are performed through the processing described above. The processing is repeated until the focus detection result satisfying the conditions is obtained.

In this manner, a focusing point that is likely to be on the main object is preferentially selected as the focusing point used for the focus adjustment, while a focusing point unsuitable for the focus adjustment is prevented from being selected. Consequently, the probability that the main object stays in focus becomes higher.

In step S105, the system control circuit 302 executes focus adjustment on the focusing lens 213 through focus calculation processing of calculating the focal position of the imaging optical system based on the output signal indicating the result of the focus detection performed on the focusing point selected in step S104.

In step S106, the system control circuit 302 executes the automatic exposure calculation through a known method based on the light metering image read out from the light metering sensor 208 in step S101.

In step S107, the system control circuit 302 determines whether the image capturing apparatus is in the SW2 state. When the image capturing apparatus is in the SW2 state (Yes in step S107), the processing proceeds to step S108 where the image capturing processing is executed. On the other hand, when the image capturing apparatus is not in the SW2 state (No in step S107), the processing proceeds to step S109 omitting the image capturing processing in step S108.

In step S108, the system control circuit 302 executes the image capturing processing, and stores the captured image in the image storage device 303. More specifically, the exposure control is performed based on the automatic exposure calculation result obtained in step S106 to adjust the diaphragm shutter 214, and then the quick return mirrors 203 and 204 are retracted from the photographic optical path.

Then, still in step S108, the focal plane shutter 210 is driven so that the image sensor 211 is exposed. After the exposure is completed, an image signal is read out from the image sensor 211, and the resultant image is stored in the image storage device 303. Finally, the quick return mirrors 203 and 204 are placed on the photographic optical path again so that the image capturing apparatus returns to a state where the light flux entering through the imaging lens 202 is reflected.

In step S109, the system control circuit 302 sets the main object area of the light metering image read out from the light metering sensor 208 in step S101 and sets the dominant color in the main object area as a tracking target color. The main object area is an area in a certain range centered at the focusing point that is selected as the focusing point used for the focus adjustment. Alternatively, the main object area may be an area detected by face detection or human body detection.

In step S110, the system control circuit 302 determines whether the image capturing apparatus is in the SW1 or SW2 state. When the system control circuit 302 determines that the image capturing apparatus is in any of the SW1 or SW2 state (Yes in step S110), the processing returns to step S101 so that the system control circuit 302 repeats the processing from step S101 to step S109. When the user has released the release button, the image capturing apparatus is neither in the SW1 or SW2 state (No in step S110), the AF tracking process is terminated.

As described above, the overall processing is executed by the image capturing apparatus having the object tracking function, according to the present exemplary embodiment.

Next, the object tracking processing according to the present exemplary embodiment will be described with reference to FIGS. 5 to 11.

FIG. 5 is a flowchart illustrating processing in step S103 in the object tracking processing in detail.

In step S501, the system control circuit 302 determines whether the object tracking processing is performed for the first time after a new tracking target has been set in a tracking target setting processing in step S109. When the object tracking processing is performed for the first time (Yes in step S501), the processing proceeds to step S502 where initial arrangement of the particles is performed for the new tracking target because the particles for the tracking have not been arranged yet. On the other hand, when the tracking processing has been executed at least once on the current tracking target (No in step S501), the processing skips step S502 and proceeds to step S503 because the particles for the tracking has been already arranged in the processing in step S507 for the previous frame. The processing in step S507 is described below.

In step S502, the system control circuit 302 performs initial arrangement of the particles on the light metering image. Each of the particles is arranged on pixel coordinates of the light metering image. A greater number of particles leads to a higher tracking accuracy but also leads to a longer processing time, and thus the number of particles to be arranged is appropriately set in accordance with the system specification. As used herein the term "particle" or "particles" refers to sample points defined on the basis of an image characteristic of the tracking target (or main object), for example, color or brightness. However, sample points may also be defined on the basis of contrast, shape or size of the tracking target (or main object).

In addition, all the particles are arranged at the centroid of the main object area detected in the tracking target setting processing in step S109. Alternatively, each of the particles may be arranged at random positions in the main object area detected in the tracking target setting processing in step S109, or at random positions in the entire light metering image.

Figure 6A:
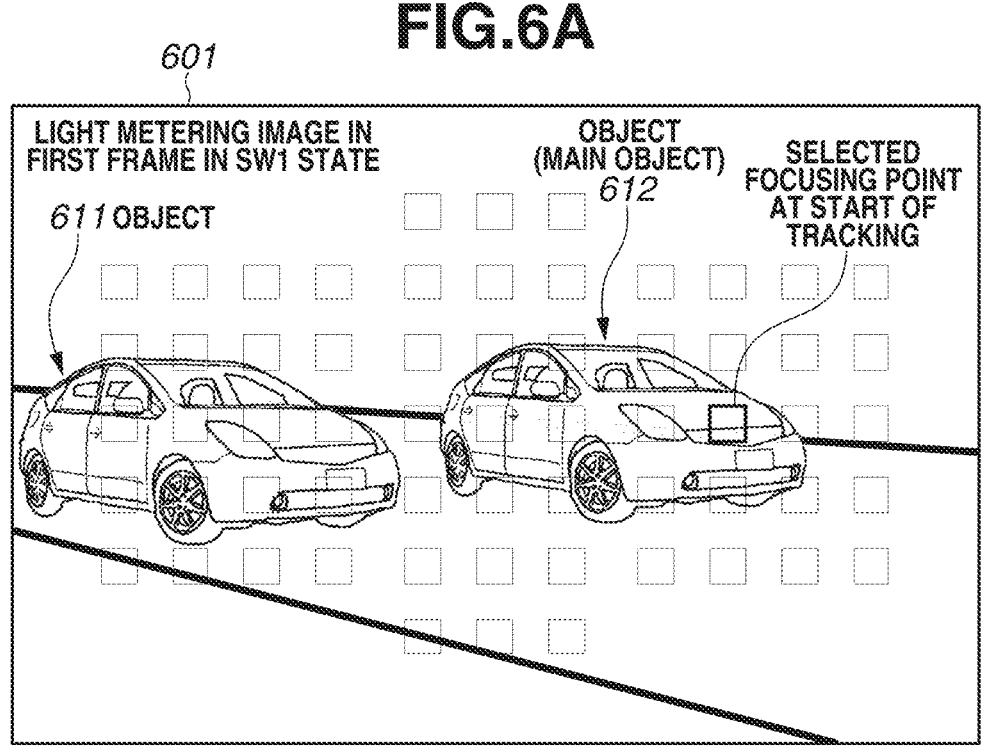
FIG. 6A is a diagram illustrating focusing points of the image capturing apparatus selected by a user in the image capturing apparatus according to the first exemplary embodiment.

FIG. 6A is a diagram illustrating the initial arrangement of the particle in the first frame after the new tracking target has been set, in the tracking target setting processing.

FIG. 6A is a diagram illustrating a state where a light metering image 601 in a first frame after the image capturing apparatus has entered the SW1 state. FIG. 6A includes two automobiles (objects 611 and 612), and the object 612 is determined to be the main object based on the focusing point selected by the user.

Here, the color of a hood of the first vehicle (object 612) has been set as the tracking target in the tracking target setting processing in step S109. In the first frame after the image capturing apparatus has entered the SW1 state, the tracking target is not set in the processing in step S102 yet, and thus the object tracking processing in step S103 is not executed.

Figure 6B:
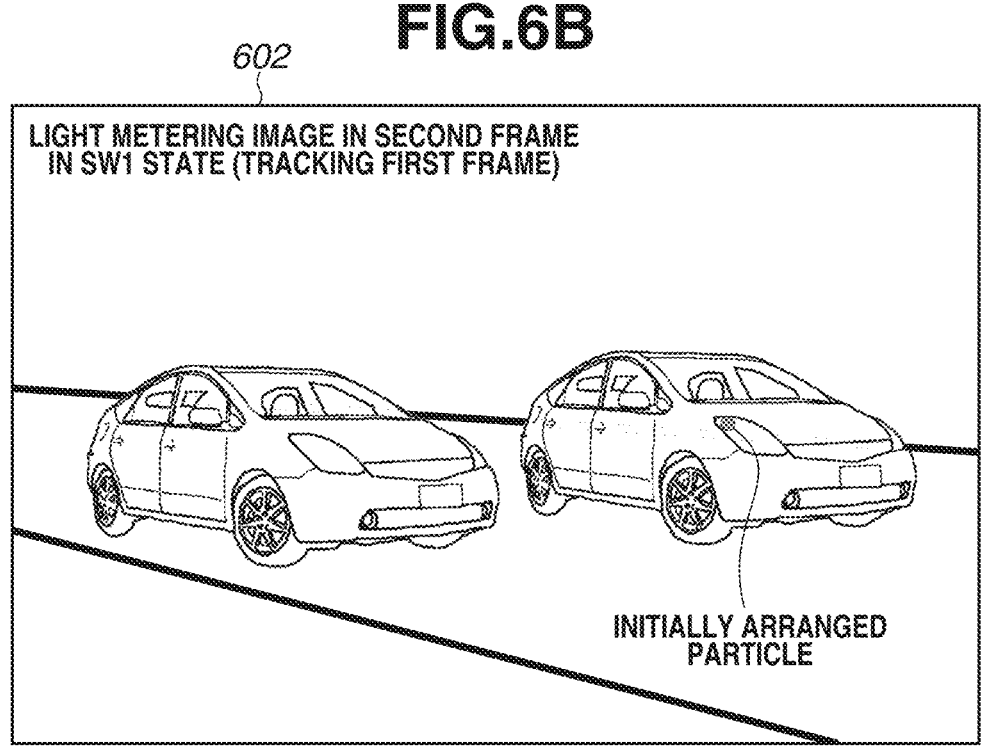
FIG. 6B is a diagram illustrating an initial arrangement of particles in the object tracking unit in the image capturing apparatus according to the first exemplary embodiment.

FIG. 6B is a diagram illustrating an initial arrangement of the particles. The second frame after the image capturing apparatus has entered the SW1 state is a first frame after the new tracking target is set. The light metering image 602 is captured in this second frame. In the light metering image 602, the two automobiles have moved forward as a time has elapsed from the state illustrated in the light metering image 601. Here, in step S502, all the particles are arranged at the centroid of the focusing point selected when the tracking has started.

In step S503, the system control circuit 302 moves all the particles to areas in the light metering image, which are presumed to include the tracking target. When the movement of the tracking target is predictable, the particles are moved to the predicted positions in accordance with the predicted movement of the tracking target, and further moved in random directions to adapt to the noise.

Figure 7:
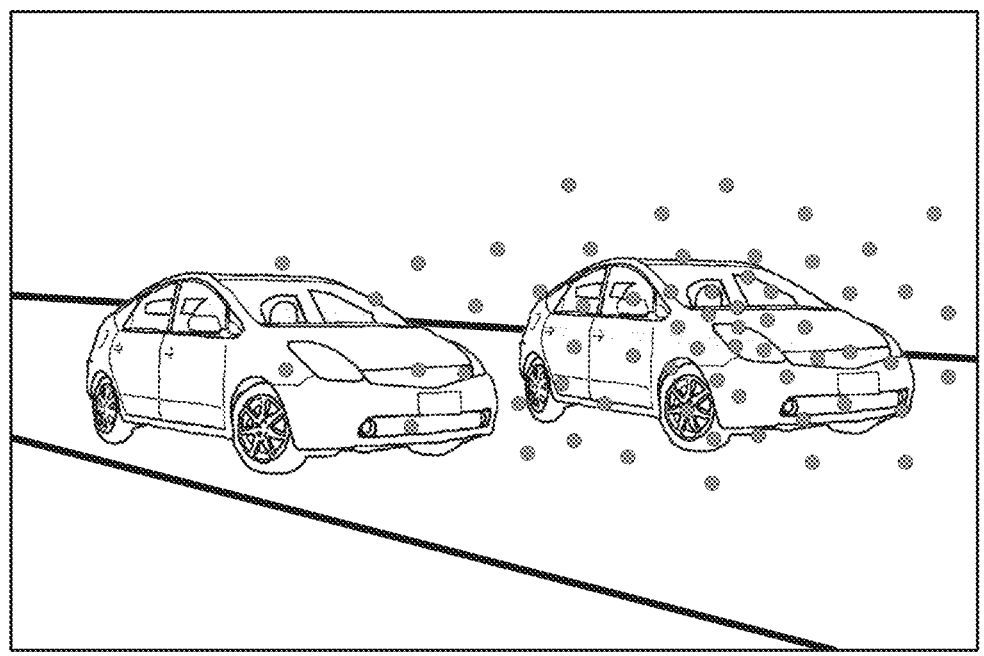
FIG. 7 is a diagram illustrating a predictive movement of particles performed by the object tracking unit in the image capturing apparatus according to the first exemplary embodiment.

When the movement of the tracking target is difficult to predict, the particles are moved in random directions over distances based on a normal distribution. FIG. 7 illustrates a result of predictive movements of the particles in the random directions over the distances based on the normal distribution, from the initial arrangement of the particles in FIG. 6B. With such movements, the tracking target moving in any direction can be tracked.

The movement amount is set in such a manner that a larger number of particles are distributed in a portion closer to the previous tracking target position. This is because a tracking target, movement of which is difficult to predict, is also likely to exist at a position relatively close to the tracking target position in the previous frame than at a position far from the tracking target position in the previous frame.

In step S504, the system control circuit 302 calculates a likelihood of each particle by using a likelihood function with an input parameter of a pixel at which the particle is positioned. For example, the likelihood function is set in such a manner that a higher likelihood is set to a particle at a pixel corresponding to a color having a smaller difference from the color of the tracking target set in step S109.

For example, as for an image captured by an image sensor having a color filter based on Bayer arrangement of red (R), green (G), and blue (B), a difference is obtained between a signal level of each of R, G, and B components in each pixel and a signal level of R, G, and B components in a feature color of the main object. A higher likelihood may be set to a particle at a pixel as absolute values of differences between the R, G, and B components become smaller.

The likelihood is further defined in such a manner that a higher likelihood is set to a particle at a position closer to the tracking target position in the previous frame. Furthermore, the likelihood function may be defined in such a manner that the peripheral color distribution around a pixel where a particle is arranged and the peripheral color distribution around the tracking target position at the tracking start point is compared, and the closer the color distribution, the higher the likelihood may be set.

In step S505, the system control circuit 302 detects an area in the light metering image where the tracking target exists, based on the likelihood of each particle calculated in step S504.

Here, particles are grouped that have likelihoods equal to or higher than a predetermined value and are not separated from each other on the light metering image coordinates at a distance longer than a predetermined value. Thus, at least one particle group is generated. Then, for each particle group, the sum of the likelihoods of the particles belonging to each particle group is calculated. Then, up to three dominant particle groups are selected in decreasing order of the sum of the likelihoods. The group with the highest, the second highest, and the lowest sum based on likelihoods are respectively referred to as first, second, and third particle groups.

An area including a larger number of particles having high likelihoods is likely to be the area including the tracking target. Thus, the area in which the particles belonging to the first particle group are distributed is most likely to be the area including the tracking target.

Figure 8:
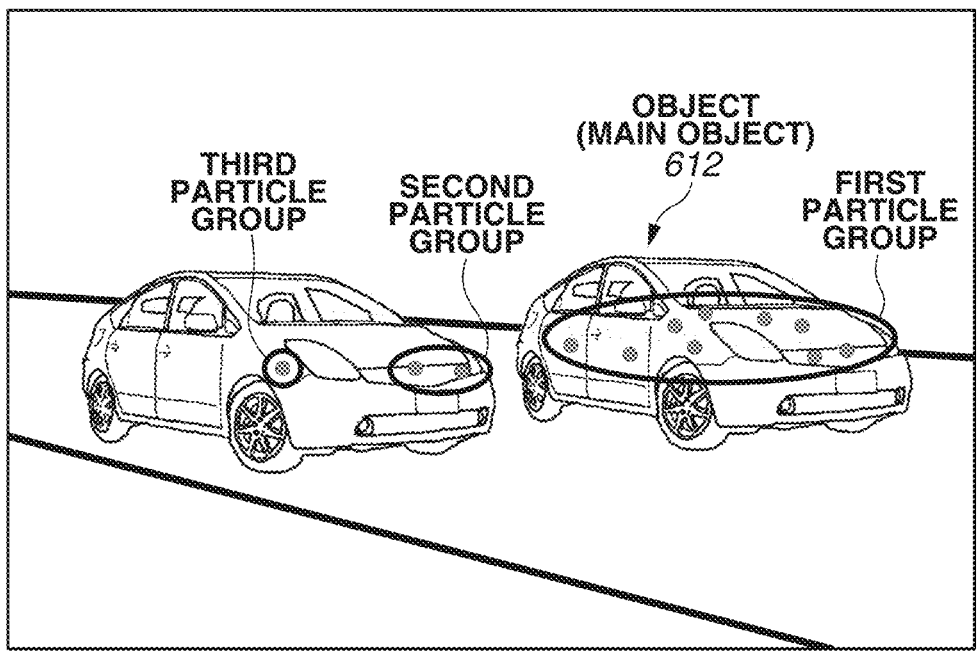
FIG. 8 is a diagram illustrating a state estimation about a tracking target performed by the object tracking unit in the image capturing apparatus according to the first exemplary embodiment.

FIG. 8 illustrates a result of calculating the likelihoods of the particles in the FIG. 7 and grouping the resultant particles. The particles on the vehicle bodies of the two automobiles with a similar color have high likelihoods because the tracking target color is the color of the hood of the object 612, and thus these particles are grouped into three groups. Here, the first particle group is a group that is close to the main object area in the light metering image 601 corresponding to the previous frame and includes the largest number of particles. The area formed by the first particle group is determined to be the area that is most likely to include the tracking target. Consequently, a state estimation of the main object is successful in this example.

In step S506, the system control circuit 302 sets a priority level to focusing points based on the distribution of the particles belonging to the dominant particle groups. FIG. 10 illustrates processing of setting the priority level to the focusing points.

In step S1001, the system control circuit 302 checks the number of particles belonging to the dominant group, distributed in each of the focusing point corresponding area group 402 in the light metering image. Then, from the number of particles with respect to the area of each focusing point corresponding area, the system control circuit 302 calculates the density of the individual particles distributed in each of the focusing point corresponding areas. Then, the system control circuit 302 extracts a focusing point corresponding area that has a density equal to or higher than a predetermined value.

Figure 9A:
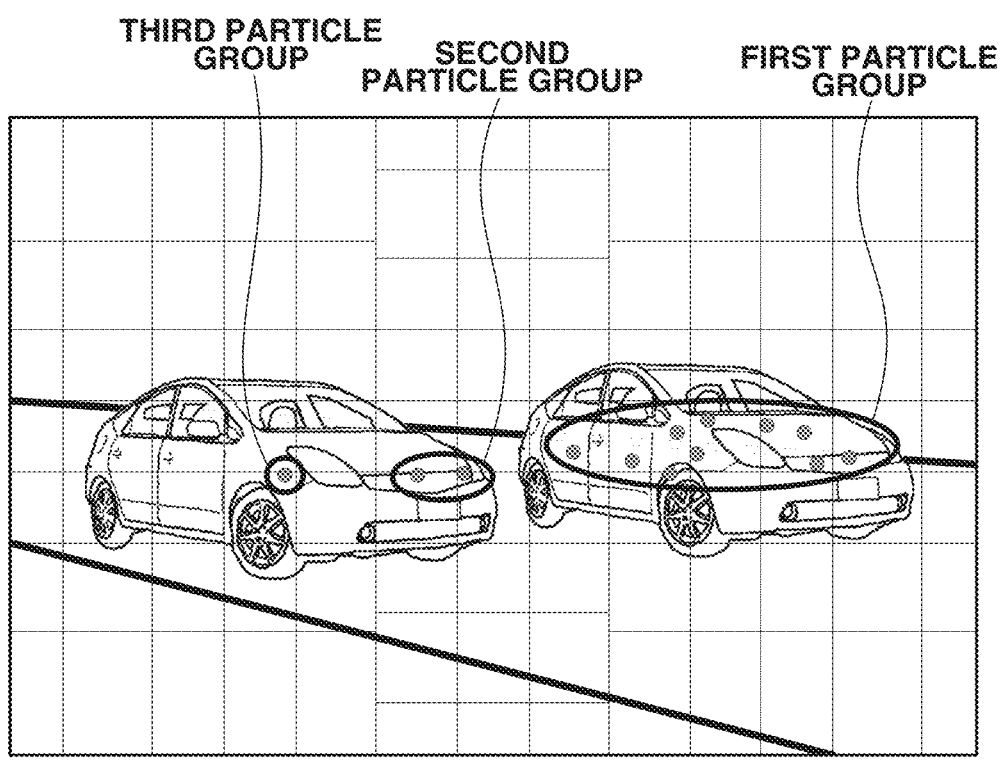
FIG. 9A is a diagram illustrating a positional relation between distribution of the particles and a focusing point area group in the image capturing apparatus according to the first exemplary embodiment.
Figure 9B:
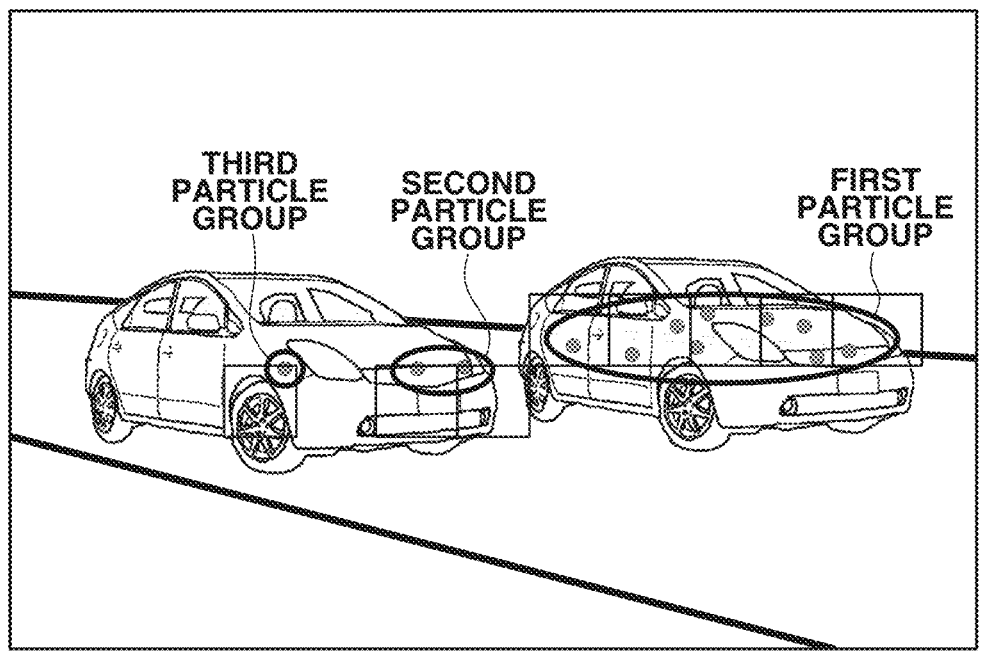
FIG. 9B is a diagram illustrating priority setting for the focusing point made by the object tracking unit in the image capturing apparatus according to the first exemplary embodiment.

FIG. 9A is a diagram in which the distribution of the particles belonging to the three dominant particle groups illustrated in FIG. 8 overlaps the focusing point corresponding area group 402 illustrated in FIG. 4B. FIG. 9A illustrates the number of particles distributed in each focusing point corresponding area. FIG. 9B illustrates a result of extracting each focusing point corresponding area including at least one particle.

In step S1002, the system control circuit 302 sets the priority level to the focusing point corresponding area extracted in step S1001 based on the group of the particles distributed in the extracted focusing point corresponding area.

More specifically, a priority level 7 is set to a focusing point corresponding area including the particle belonging to the first particle group. A priority level 4 is set to a focusing point corresponding area including the particle belonging to the second particle group. A priority level 1 is set to a focusing point corresponding area including the particle belonging to the third particle group. When there is a focusing point corresponding area including particles belonging to different groups, a priority level corresponding to the particle having the higher dominant particle group level is set.

As a result of the state estimation processing in step S505, the particles are distributed in areas which are likely to include the tracking target. In the area, the probability of including the tracking target is higher in the order of the first particle group, the second particle group, and the third particle group. Thus, a higher priority level is set to the focusing point corresponding area in which particles, belonging to a group corresponding to a higher probability, are distributed. Accordingly, a higher priority level can be set to the focusing point that is more likely to include the tracking target.

In step S1003, the system control circuit 302 calculates the distribution density of the particles from the area of each focusing point corresponding area and the number of particles belonging to the group having the highest probability in the focusing point corresponding area. Then, for the focusing point corresponding area with the density of the distributed particles higher than a first threshold, two is added to the priority level set in step S1002. For the focusing point corresponding area with the density of the distributed particles lower than the first threshold and higher than a second threshold, one is added to the priority set in step S1002. For the focusing point corresponding area with the density of the distributed particles lower than second threshold, the priority level set in step S1002 is not increased.

Area having high density of the particles indicates that a larger number of particles are arranged in the area as a result of the predictive movement in step S503, or that a portion of the area overlapping the area including the tracking target is relatively large. Thus, by setting the priority level based on the density, a high priority can be set to the focusing point corresponding area where the tracking target is likely to exist.

Figure 11A:
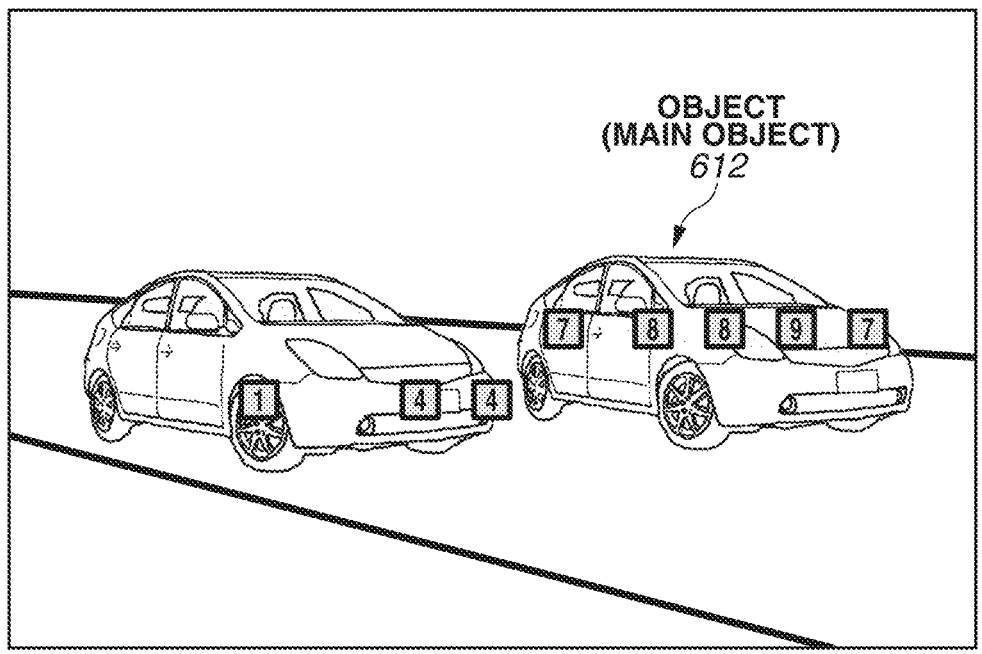
FIG. 11A is a diagram illustrating focusing points to which the priorities have been set in the image capturing apparatus according to the first exemplary embodiment.

FIG. 11A illustrates a result of setting the priorities to the focusing points each corresponding to the focusing point corresponding areas in FIG. 9B based on the priority setting processing described above. Each focusing point is denoted with a number corresponding to the priority level set to the focusing point.

A priority level 9 is set to the focusing point corresponding area that includes three or more particles belonging to the first particle group. A priority level 8 is set to the focusing point corresponding area that includes two particles belonging to the first particle group. The priority level 7 is set to the focusing point corresponding area that includes one or less particle belonging to the first particle group.

Priorities of the other focusing point corresponding areas are set based on the number of particles belonging to the second and the third particle groups.

Next, the other steps in the flowchart in FIG. 5 will be described.

In step S507, the system control circuit 302 normalizes the likelihoods of each particle calculated in step S504 such that the sum of the likelihoods of all the particles becomes 1. Then, through resampling based on uniform random numbers and the normalized likelihood, a number of new particles same as the number of the particles arranged in step S502 is generated. The particles that have been already arranged are replaced with the new particle group. Thus, a larger number of particles are arranged in an area close to the main object in the light metering image. Accordingly, the arrangement of particles can be more suitable for detecting the tracking target in the subsequent frame.

As described above, the priority of the focus detection is set to the focusing point corresponding area as an image area corresponding to each focusing point based on the density of particles distributed in the area. Thus, the focus detection can be preferentially performed on the area that is likely to include the main object.

Figure 11B:
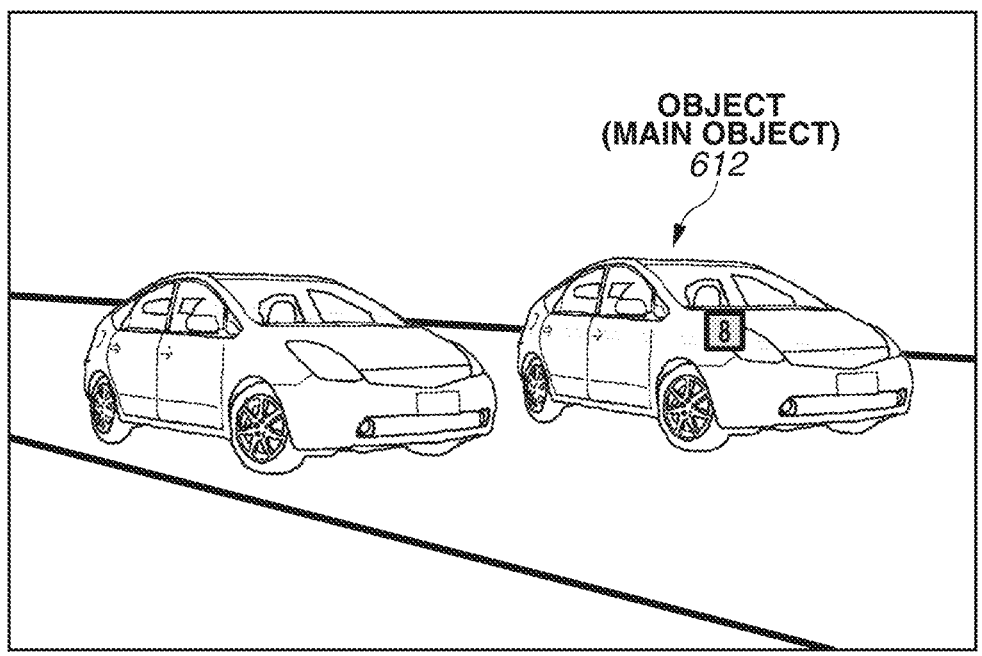
FIG. 11B is a diagram illustrating focusing point selection based on the priorities in the image capturing apparatus according to the first exemplary embodiment.

FIG. 11B illustrates an example of the focusing point finally selected in the focusing point selection processing in step S104 in accordance with the priorities set as illustrated in FIG. 11A. In this example, the focus detection is most preferentially performed on the focusing point having the priority level 9, but the focus detection fails due to the insufficient contrast. This is because the focusing point having the priority level 9 is set on the hood of the automobile. The focus detection is then performed on the focusing point having the priority level 8. The focusing point having the priority level 8 is at the boundary between a headlight and a body of the automobile and thus a high contrast can be obtained from the focusing point having the priority level 8. As a result, the focusing point having the priority level 8 is finally selected as the focusing point used for the focus adjustment.

In the present invention produced according to the exemplary embodiment described above, it is desirable that the focusing point selection processing in step S104 described above includes the following processing.

More specifically, in a case where there is a plurality of focusing points having the same priority in selecting the focusing point that is subjected to the focus detection based on the priority in step S104, it is determined whether each of the focusing points is the cross-type sensor. Then, only focusing point(s) corresponding to the cross-type sensor are (is) extracted as the selected focusing point candidate. When there is no focusing point corresponding to the cross-type sensor, the focusing point corresponding to the smallest F number is extracted as the selected focusing point candidate. When all the focusing points correspond to the same F number, all the focusing points are extracted as the selected focusing point candidates.

When it is determined that none of the selected focusing point candidates is suitable for the focus adjustment, a focusing point that is not the cross-type sensor but has the same priority or a focusing point corresponding to a larger F number is extracted as (a) next focusing point candidate(s) to be selected. Then, the next focusing point candidate(s) is (are) similarly subjected to the focus detection and the condition determination. When there is still no focusing point satisfying the condition, the focusing point having the next highest priority is extracted as the selected focusing point candidate(s). The selected focusing point candidate(s) is (are) similarly subjected to the focus detection and the condition determination. This procedure is repeated until the focus detection result satisfying the condition is obtained.

By thus preferentially selecting the focusing point that corresponds to the cross-type sensor or has a smaller F number from the focusing points having the same priority, the accuracy of focus adjustment can be enhanced. Furthermore, since the focusing point(s) having a higher priority and higher accuracy is(are) preferentially extracted, the focusing points on the main object can be efficiently selected with a small number of focus detections in a case where the number of focusing points with which the focal point can be detected in a single frame is limited due to a restriction such as a request processing time. In this manner, the focus adjustment can be more accurately performed on the main object compared with the exemplary embodiment described above.

A second exemplary embodiment of the present invention is described below. The first exemplary embodiment is based on the configuration in which the image capturing apparatus is the digital single-lens reflex camera including the quick return mirrors 203 and 204, the ranging sensor 205, the light metering sensor 208, and the pentagonal prism 207 for the optical finder. Alternatively, the present invention can be applied to a camera including no optical finder.

Thus, a method of realizing the present invention in the image capturing apparatus including no optical finder is described in the second exemplary embodiment.

The image capturing apparatus according to the second exemplary embodiment is described below with reference to FIGS. 12 to 14.

Figure 12:
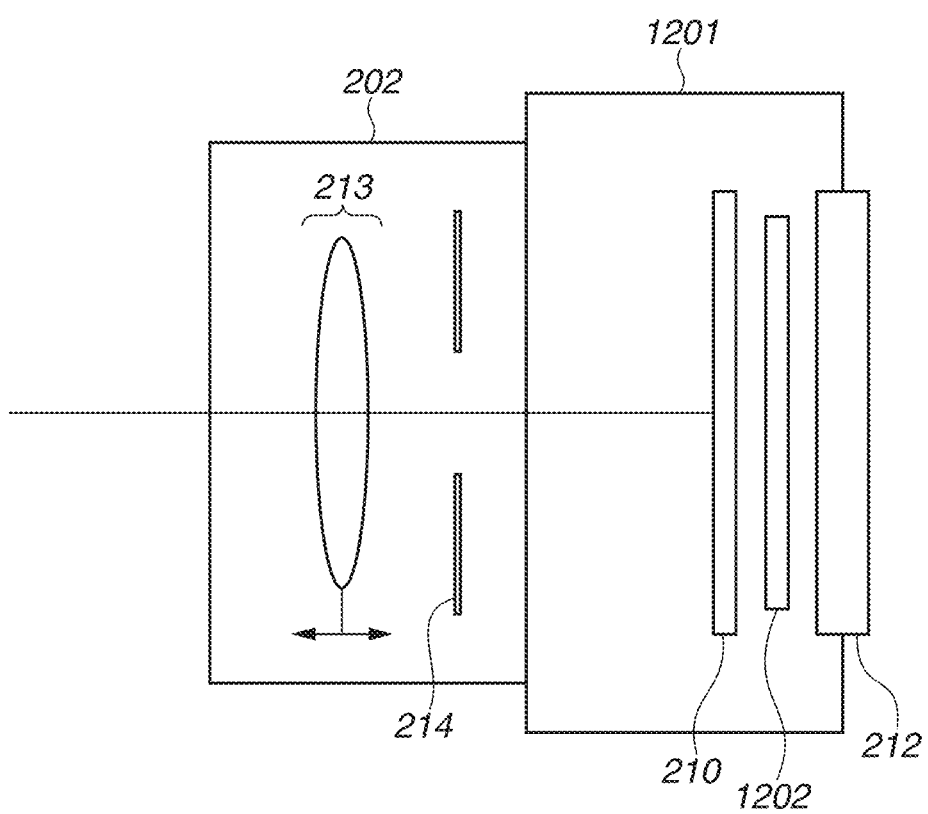
FIG. 12 is a schematic diagram illustrating a schematic configuration of an image capturing apparatus according to a second exemplary embodiment.

FIG. 12 is a diagram illustrating the image capturing apparatus according to the second exemplary embodiment of the present invention. Components in FIG. 12 that are the same as the counterparts in the image capturing apparatus according to the first exemplary embodiment are denoted with the reference numerals that are the same as those in FIG. 2, and will not be described in the present exemplary embodiment.

In FIG. 12, the imaging lens 202 is mounted on the front surface of a camera main body 1201. The imaging lens 202 is interchangeable and is electrically connected to the camera main body 1201 via a mount contact group (not illustrated).

When the exposure is performed, the focal plane shutter 210 is opened so that an image sensor 1202 is exposed. The image sensor 1202 includes pixels for image forming and pixels for phase difference detection. The pixels for image forming are used for forming a captured image when the image sensor 1202 is exposed. The pixels for phase difference detection are used for performing the focus adjustment by detecting a focal point of an object through a known phase difference detection method. The image capturing apparatus according to the present exemplary embodiment performs focus adjustment of the lens by using the pixels for phase difference detection.

Figure 13:
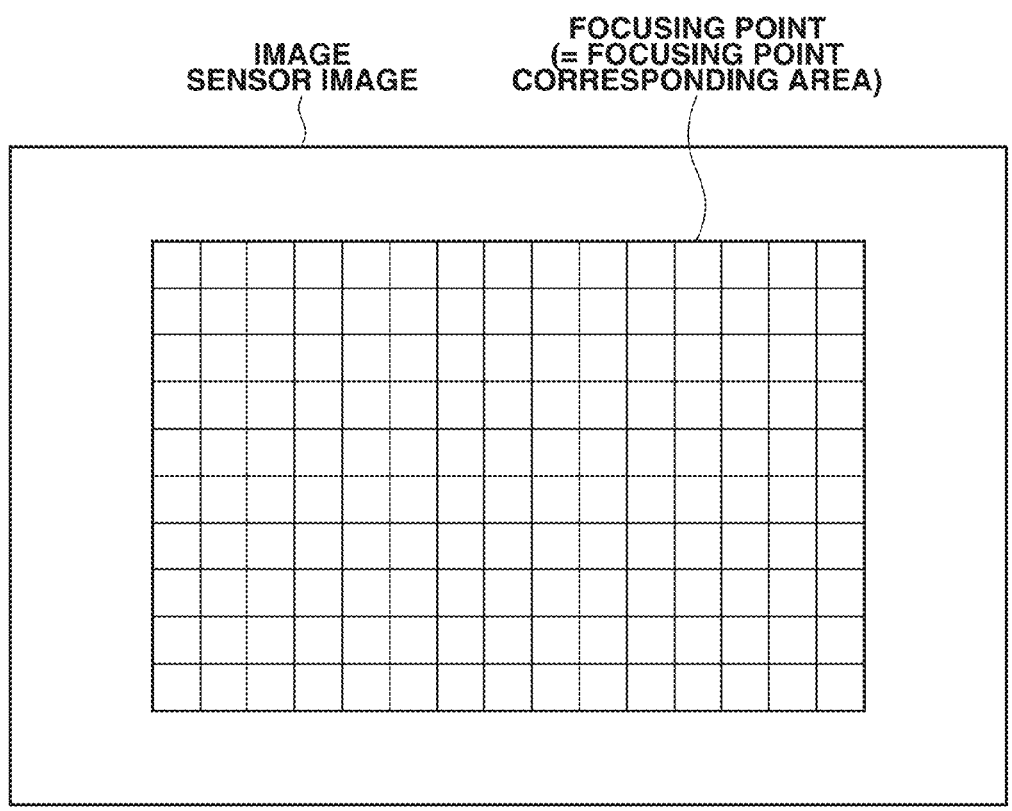
FIG. 13 is a diagram illustrating a relationship between a focusing point arrangement and an image sensor image in the image capturing apparatus according to the second exemplary embodiment.

FIG. 13 is a diagram illustrating focusing points in the image sensor 1202. The focus adjustment is performed by using outputs from the pixels for phase difference detection corresponding to the focusing point areas forming a grid. The image capturing apparatus according to the present exemplary embodiment has a structure that is known as a mirror-less camera structure including no quick return mirror.

Figure 14:
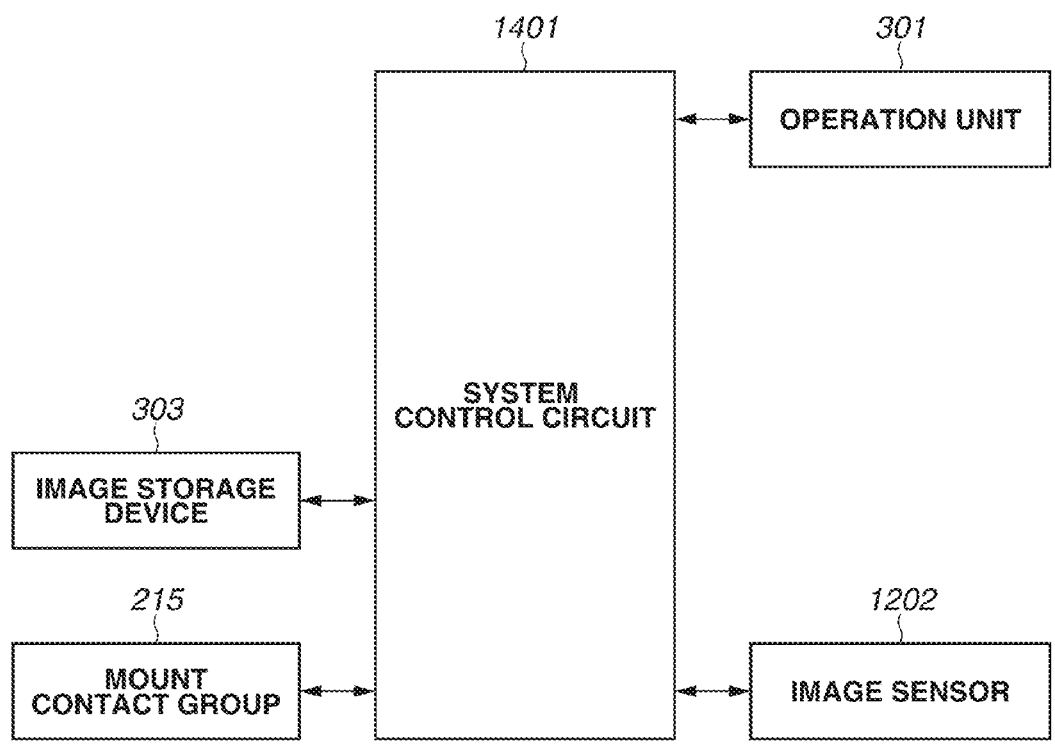
FIG. 14 is a block diagram illustrating a basic configuration of the image capturing apparatus according to the second exemplary embodiment.

FIG. 14 is a diagram illustrating functional blocks of the image capturing apparatus according to the present exemplary embodiment that includes no dedicated light metering sensor or dedicated ranging sensor, which is different from the image capturing apparatus according to the first exemplary embodiment.

The operation unit 301 detects a user operation performed on, for example, a release button, a switch, a dial, connected equipment (not illustrated), and the like that are attached to the camera main body 1201, and transmits a signal corresponding to the operation to a system control circuit 1401.

The release button is a two-stage pressing switch having half-pressed and full-pressed states. The operation unit 301 outputs to the system control circuit 1401, an SW1 signal at the moment that the release button is half pressed and an SW2 signal at the moment that the release button is fully pressed. The operation unit 301 outputs an SW release signal at the moment that the user removes a finger from the release button, to the system control circuit 1401.

The system control circuit 1401 performs a preparation operation before the image capturing is carried out, such as automatic exposure calculation or automatic focusing when the SW1 signal is received. The system control circuit 1401 executes image capturing processing with the image sensor 1202 exposed to light, when the SW2 signal is received. The automatic exposure calculation and the object tracking processing are executed using an image including pixels used for forming an image by the image sensor 1202. On the other hand, the focus detection calculation is performed based on output from a pixel of the image sensor 1202 for phase difference detection.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-182679, filed Sep. 8, 2014, which is hereby incorporated by reference herein in its entirety.

What is claimed is:

1. An image capturing apparatus comprising:
an image capturing unit configured to capture an image formed by an imaging optical system;
an object detection unit having a particle filter and configured to detect a main object in the image with the particle filter;
a focus detection unit configured to detect a focus state of an object with a plurality of focus detection areas;
a selection unit configured to select a focus detection area where a focal point is detected from the plurality of the focus detection areas; and
a focus calculation unit configured to calculate a focal position of the imaging optical system based on a signal output from the focus detection area selected by the selection unit,
wherein the selection unit is configured to divide the image into divided areas corresponding to each of the plurality of focus detection areas, set a priority to each of the focus detection areas based on a distributed state of particles distributed in each of the divided areas, and detected by the object detection unit, and select the focus detection area based on the priority.

2. The image capturing apparatus according to claim 1, wherein the object detection unit is configured to classify the particles into at least one particle group, and set a priority order to each particle group based on a sum of likelihoods of the classified particles, and
wherein the selection unit sets the priority to each of the focus detection areas based on the priority order of the particle group to which the particles distributed in each of the divided areas belong.

3. The image capturing apparatus according to claim 1, wherein the selection unit is configured to set the priority to each of the focus detection areas based on a distribution density of the particles, the distribution density being calculated from an area of each of the divided areas and the number of the particles detected by the object detection unit and distributed in each of the divided areas.

4. The image capturing apparatus according to claim 1, wherein the object detection unit is configured to classify each of the particles into at least one particle group, and the selection unit is configured to set the priority to the focus detection area based on a sum of likelihoods of the classified particles and a distribution density of the particles distributed in each of the divided areas.

5. The image capturing apparatus according to claim 1, wherein the image capturing unit and the focus detection unit operate based on an image signal output from an identical imaging element.

6. A control method for an image capturing apparatus, the control method comprising:
capturing and generating an image from an object image formed by an imaging optical system;
detecting a main object in the image with a particle filter;
detecting a focus state of an object with a plurality of focus detection areas;
selecting an area with which a focal point is detected from the plurality of the focus detection areas; and
performing focus calculation to calculate a focal position of the imaging optical system based on a signal output from the selected focus detection area,
wherein the selecting includes dividing the image into divided areas corresponding to each of the plurality of focus detection areas, setting a priority to each of the focus detection areas based on a distributed state of particles distributed in each of the divided areas and detected in the detecting of the object, and selecting the focus detection area based on the priority.

7. A non-transitory computer-readable storage medium which stores a program for causing a computer to execute the control method according to claim 6.

8. The image capturing apparatus according to claim 1, wherein, in a case where a focus state of the object with the selected focus detection area does not satisfy a predetermined condition, the selection unit selects another focus detection area based on the priority.

9. The image capturing apparatus according to claim 1, wherein the selection unit sets the priority to each of the focus detection areas based on a distribution density of the particles.

10. An image capturing apparatus comprising:
a light metering sensor that captures an image formed by an imaging optical system;
a ranging sensor that detects a focus state of an object with a plurality of focus detection areas; and
a system control circuit that detects an object in the image with a particle filter, sets a priority to each of the focus detection areas based on a distributed state of particles of the particle filter distributed in each of areas corresponding to the plurality of focus detection areas, and calculates a focal position of the imaging optical system based on a signal output from the focus detection area selected based on the priority.

11. The image capturing apparatus according to claim 10, wherein, in a case where a focus state of the object with the selected focus detection area does not satisfy a predetermined condition, the system control circuit selects another focus detection area based on the priority.

12. The image capturing apparatus according to claim 10, wherein the system control circuit sets the priority to each of the focus detection areas based on a distribution density of the particles.

13. An image capturing apparatus comprising:
an image sensor that captures an image formed by an imaging optical system; and
a system control circuit that detects an object in the image with a particle filter, sets a priority to each of focus detection areas in the image based on a distributed state of particles of the particle filter distributed in each of areas corresponding to the plurality of focus detection areas, and calculates a focal position of the imaging optical system based on a signal output from the focus detection area selected based on the priority.

14. The image capturing apparatus according to claim 13, wherein, in a case where a focus state of the object with the selected focus detection area does not satisfy a predetermined condition, the system control circuit selects another focus detection area based on the priority.

15. The image capturing apparatus according to claim 13, wherein the system control circuit sets the priority to each of the focus detection areas based on a distribution density of the particles.

16. An image capturing apparatus comprising:
a light metering sensor that captures an image formed by an imaging optical system;
a ranging sensor that detects a focus state of each of a plurality of focus detection areas; and
a system control circuit that detects an object in the image with a particle filter, selects a focus detection area based on a distributed state of particles of the particle filter distributed in each of areas corresponding to the plurality of focus detection areas, and calculates a focal position of the imaging optical system based on a signal output from the selected focus detection area,
wherein, in a case where a focus state of the selected focus detection area does not satisfy a predetermined condition, the system control circuit selects another focus detection area based on a distributed state of particles of particle filter.

17. The image capturing apparatus according to claim 16, wherein, in a case where a focus state of the another focus detection area satisfies the predetermined condition, the system control circuit calculates the focal position of the imaging optical system based on a signal output from the another focus detection area.

18. The image capturing apparatus according to claim 16, wherein the system control circuit sets the priority to each of the focus detection areas based on a distribution density of the particles.

19. An image capturing apparatus comprising:
an image sensor that captures an image formed by an imaging optical system; and
a system control circuit that detects an object in the image with a particle filter, selects a focus detection area based on a distributed state of particles of the particle filter distributed in each of areas corresponding to a plurality of focus detection areas in the image, and calculates a focal position of the imaging optical system based on a signal output from the selected focus detection area,
wherein, in a case where a focus state of the selected focus detection area does not satisfy a predetermined condition, the system control circuit selects another focus detection area based on a distributed state of particles of particle filter.

20. The image capturing apparatus according to claim 19, wherein, in a case where a focus state of the another focus detection area satisfies the predetermined condition, the system control circuit calculates the focal position of the imaging optical system based on a signal output from the another focus detection area.

21. The image capturing apparatus according to claim 19, wherein the system control circuit sets the priority to each of the focus detection areas based on a distribution density of the particles.

22. An image capturing method, comprising:
capturing an image with an image sensor that captures an object image formed by an imaging optical system;
detecting, using a particle filter, an object in the image captured by the image sensor;
selecting, using a system control circuit, a focus detection area based on a distributed state of particles of the particle filter distributed in each of areas corresponding to a plurality of focus detection areas in the image; and
calculating, using the system control circuit, a focal position of the imaging optical system based on a signal output from the selected focus detection area,
wherein, in a case where a focus state of the selected focus detection area does not satisfy a predetermined condition, the system control circuit selects another focus detection area based on a distributed state of particles of the particle filter.

* * * * *